United States Patent [19]

Skrypek et al.

[11] 4,009,776
[45] Mar. 1, 1977

[54] CAN UNLOADER
[75] Inventors: John P. Skrypek, Mahwah; Arnold Peters, West Paterson; Robert Williams, Randolph, all of N.J.
[73] Assignee: Sun Chemical Corporation, New York, N.Y.
[22] Filed: Nov. 6, 1974
[21] Appl. No.: 521,359
[52] U.S. Cl. .............................. 198/478; 198/651; 198/689; 214/1 BT
[51] Int. Cl.$^2$ ........................................ B65G 47/00
[58] Field of Search .......... 198/22 R, 25, 179, 167, 198/210, 689, 651, 478; 214/1 BT, 1 BS, 1 BH, 1 BU; 101/39, 40

[56] References Cited
UNITED STATES PATENTS

| 2,804,963 | 9/1957 | Nowak | 214/1 BT |
|---|---|---|---|
| 3,016,153 | 1/1962 | Porterfield | 214/1 BV |
| 3,339,698 | 9/1967 | Hartmeister et al. | 101/40 X |
| 3,344,904 | 10/1967 | Kocian et al. | 198/179 |
| 3,586,175 | 6/1971 | Gauld | 101/40 X |
| 3,766,851 | 10/1973 | Sirvet et al. | 214/1 BS |

Primary Examiner—Robert J. Spar
Assistant Examiner—James M. Slattery
Attorney, Agent, or Firm—Cynthia Berlow

[57] ABSTRACT

Apparatus for unloading decorated cans from wire brush-type container carriers or holders mounted on a closed-loop conveyor chain moving along a path extending through a curing oven includes a plurality of retriever rods mounted on a continuous rotating wheel. Radial movement of the retriever rods is programmed so that the free end of each rod engages the closed end of a can on the outside thereof, axially moving the can from a rear pocket of the wheel to an aligned front pocket. This movement strips the can from the holder, and when the stripped can reaches a predetermined angular position of the wheel such can is directed by gravity into an output conveyor chute.

10 Claims, 12 Drawing Figures

FIG. 1.

CAN UNLOADER

This invention relates to container decorating apparatus in general and more particularly relates to a novel unloader which removes decorated containers from a deformable carrier disposed within the container.

U.S. Pat. No. 3,766,851, issued Oct. 23, 1973, to E. Sirvet et al. for a Continuous Can Printer and Handling Apparatus describes machinery which decorates undecorated cans, applies a protective coating of varnish over the decoration, and transports the varnish-coated can to a curing oven, with each can being mounted on an individual pin secured to a conveyor chain that travels through the curing oven. The cans are loosely mounted on the pins during the journey through the curing oven. This arrangement is satisfactory when convection heating is utilized for curing.

However, in order to reduce the size of the curing oven, radiation-curing is utilized. This requires uniform exposure to the radiation source for all portions of the can having an ink or a protective coating thereon. Because of this, the conveyor chain pins are provided with radially extending spring elements, conveniently forming a wire brush-type structure which serves to center the can with respect to the pin and frictionally engages the can so that rotation of the brush will cause the can to rotate. At production speeds in the order of at least 800 cans per minute, a problem arises in stripping the cans from the holders and delivering these cans to an output conveyor without damaging the cans.

In the prior art stripping of cans from the conveyor brushes was accomplished by engaging the open ends of the can with a mechanism that pushed each can from the holder and in so doing moved the length of the brush traveling axially through the bristles thereof. At high operating speeds this stripping mechanism causes rapid wearing of the holders and often causes damage to the can edge at the open end of the can, thereby interfering with the application of can tops.

In accordance with the instant invention the unloading of decorated cans is accomplished by utilizing suction retrieving rods mounted to a continuous rotating wheel having a sprocket portion that engages the conveyor chain at the output of the curing oven so that cans carried by the holders on the conveyor chain are guided into and are seated in pockets of a receiving portion of the wheel. Each of the retrieving rods is then moved axially to engage the closed end of the container. Movement of each retrieving rod and the application of vacuum thereto is programmed so that after initial engagement of the rod with the can, the latter pushes the former rearward until the open end of the can engages a rear wheel with slight overtravel of the rod being permitted by deforming of the suction cup at the free end of the rod. As the suction cup engages the can, vacuum is applied to draw the can against the suction cup. The rod then moves forward to remove the can from the holder and delivers the can to a pocket in an output portion of the rotating wheel. Forward movement of the can is arrested by engagement thereof with a front rotating plate, at which time vacuum at the suction cup is discontinued and shortly thereafter the interior of the suction cup is vented to atmosphere and the rod continues to move forward to separate the suction cup from the can. Thereafter, gravity transfers the can from the output pocket to a downwardly extending output chute.

Accordingly, a primary object of the instant invention is to provide novel means for unloading decorated cans from a resilient holder.

Another object is to provide an unloading means of this type constructed for reliable, high speed operation.

Still another object is to provide an unloading means of ths type which utilizes controlled axially moving arms that engage the can solely at its closed end.

A further object is to provide an unloading device of this type in which the retrieving rods and valving therefor are of novel construction.

A still further object is to provide an unloading device of this type constructed so that access may readily be had for the clearing of jams.

These objects as well as other objects of this invention shall become readily apparent after reading the following description of the accompanying drawings in which:

Figure 1:
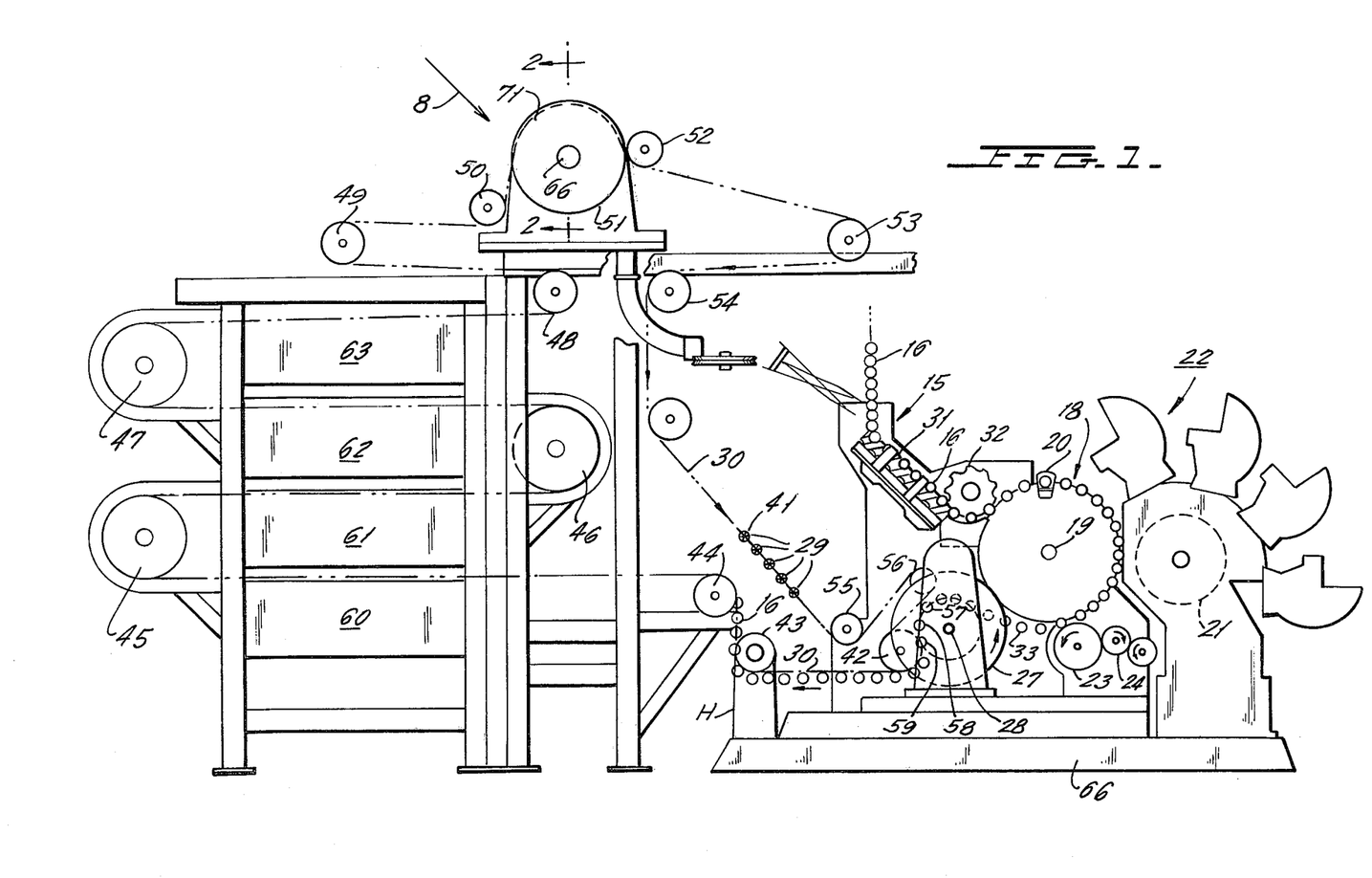
FIG. 1 is a front elevation of can decorating apparatus including an unloading device constructed in accordance with teachings of the instant invention.

Now referring to the figures and more particularly to FIG. 1 which shows apparatus for decorating undecorated seamless cans 16 supplied by conveyor means 15. The latter includes lead screw 31 feeding cans 16 into star wheel 32 from whence they are delivered to cradles 17 of wheel 18 that is rotating on shaft 19. Cams 16 are then moved axially on cradles 17 and transferred to mandrels 20, also mounted on wheel 18. The path of each mandrel 20 is such that the outer cylindrical surface of each can 16 engages the periphery of rotating image transfer mat 21 of the printing or decorating section indicated generally by reference numeral 22.

Decorated cans 33, while still mounted to spindles 20, engage the periphery of applicator roll 23 in over-varnish unit indicated generally by reference numeral 24, which applies a protective coat of varnish over the decorations. Thereafter, decorated cans 33 are moved to transfer wheel 27 rotating on shaft 28. From wheel 27 cans 33 are transferred to holders 41 each constructed in the form of a wire brush mounted to an individual pin 29. Pins 29 are secured to endless conveyor chain 30 and extend generally perpendicular to the plane in which chain 30 moves. The path of movement for chain 30 is defined by sprockets 42–59 inclusive, and extends through stacked radiation curing ovens 60–63 inclusive, where the ink or coating on each decorated can 33 is cured, and through unloader 65 where can 33 is stripped from holder 41.

The constructions and functions of conveyor 15, wheel 18, decorating section 22, overvarnish section 24, and transfer wheel 27 are described in greater detail in the aforesaid U.S. Pat. No. 3,766,851.

Figure 2:
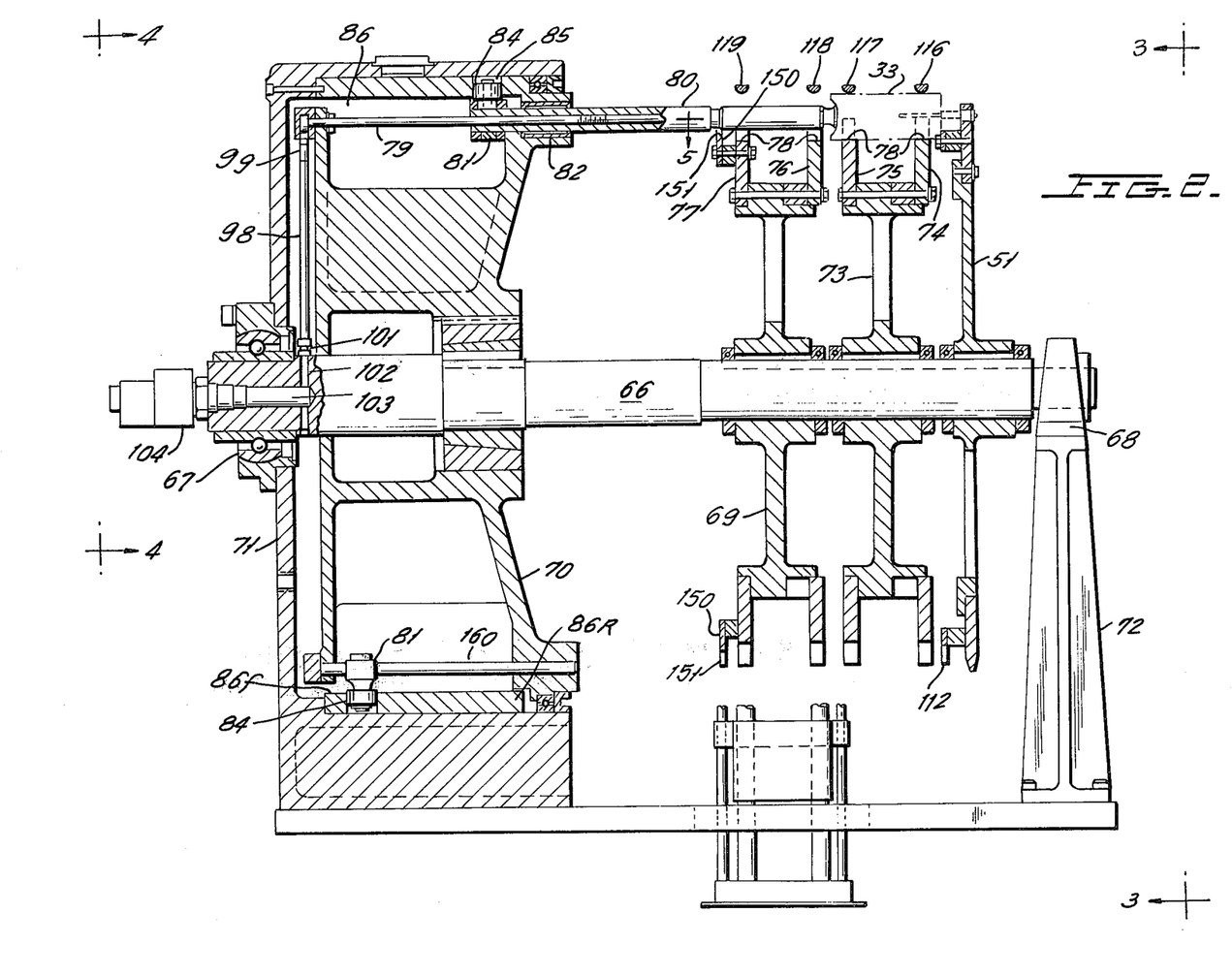
FIG. 2 is a cross-section of the unloading device rotating wheel taken through line 2—2 of FIGS. 1 and 3, looking in the direction of arrows 2—2.
Figure 3:
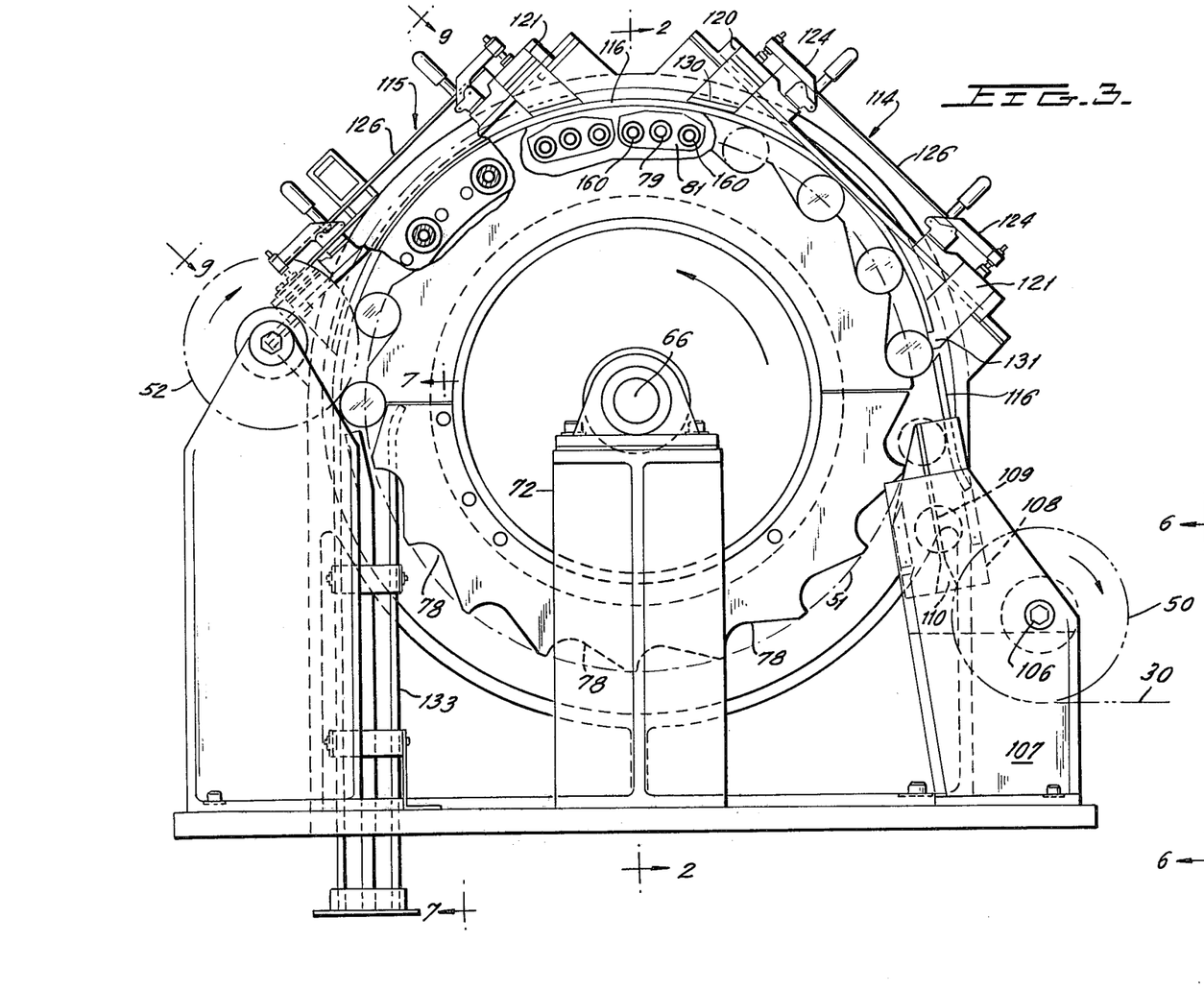
FIG. 3 is a rear elevation of the unloader, looking in the direction of arrows 3—3 of FIG. 2.
Figure 4:
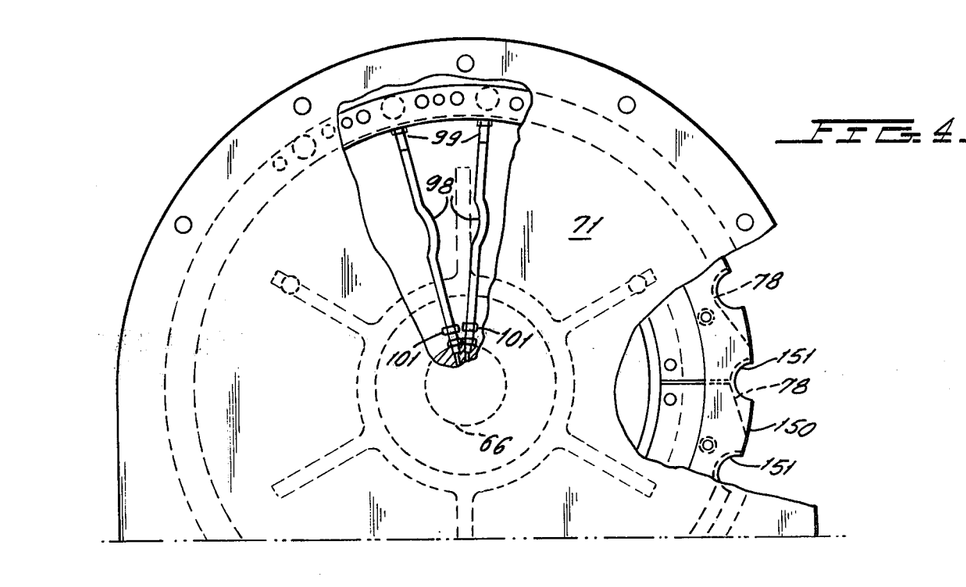
FIG. 4 is a fragmentary front elevation of the unloader, looking in the direction of arrows 4—4 of FIG. 2.

As seen best in FIG. 2, sprocket 51 is keyed to shaft 66 that is rotatably supported at opposite ends thereof by bearings 67, 68 in housing 71 and post 72, respectively, with the latter being positioned behind the former. Sprocket 51 and shaft 66 are portions of a continuous rotating transfer assembly that includes rear star-wheel 73, front star-wheel 69, and retriever rod carrier 70, all keyed to shaft 66. Carrier 70 is mounted in front of front star-wheel 69 and sprocket 51 is mounted behind rear star-wheel 73. The periphery of rear star-wheel 73 includes axially spaced rings 74, 75. Similarly, front star-wheel 69 includes axially spaced rings 76, 77. The periphery of each ring 74–77 is provided with nineteen equally spaced notches defining notches or pockets 78 to seat cans 33. For a reason to be hereinafter seen, pockets 78 of all four rings 74–77 are in alignment. Also aligned with each of the pockets 78 is a plurality of hollow vacuum feed tubes 79 mounted to carrier 70 and extending parallel to shaft 66. The forward end of each vacuum feed tube 79 is connected through an individual fitting 99, conduit 98, fitting 101, and radial shaft passage 102 to axial chamber 103 at the forward end of shaft 66, which in turn is connected through rotating vacuum coupling 104 to a vacuum source (not shown).

Figure 11:
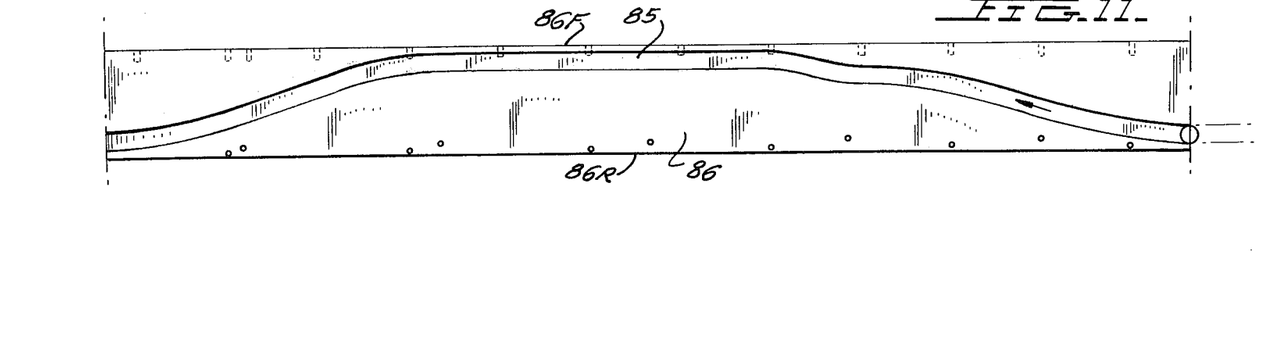
FIG. 11 is a development of the cam slot used to control axial movement of the retrieving rods.
Figure 12:
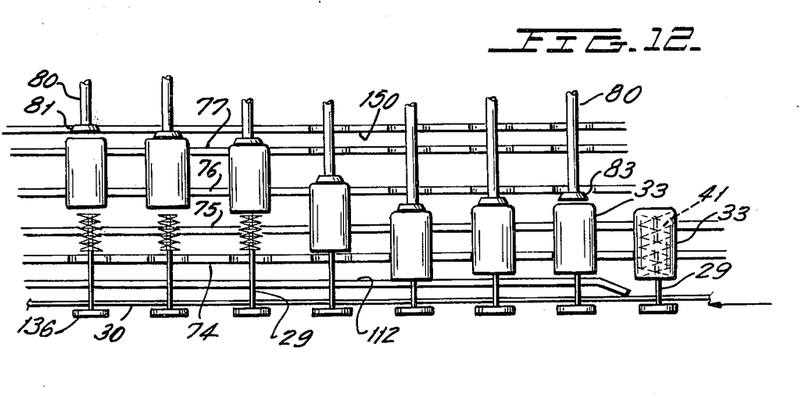
FIG. 12 is a schematic diagram showing various positions of a can and retrieving rod during stripping of the can from the carrier or holder.

The rear of each tube 79 is entered axially into an individual retriever rod 80 through its forward end. Each rod 80 is secured at its forward end to block 81 and is mounted in bearings 82 for axial movement with respect to carrier 70. The free or rear end of rod 80 is provided with suction cup 83. Each block 81 is provided with an individual follower wheel 84 positioned in cam slot 85 formed in ring 86 disposed inside housing 71. A flat projection of ring 86 and cam slot 85 is seen in FIG. 11, in which the front and rear edges of ring 86 are designated by reference numerals 86F and 86R, respectively. Axial movement of each block 81 is guided by a pair of rods 160, 160.

Figure 5:
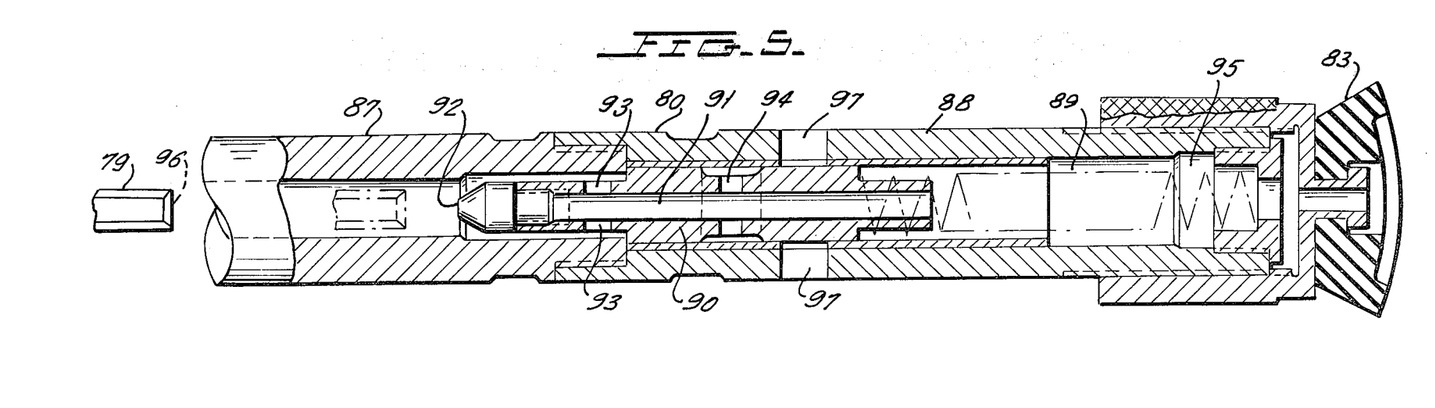
FIG. 5 is an enlarged longitudinal cross-section of one of the retrieving rods taken through line 5—5 of FIG. 2 looking in the direction of arrows 5—5.
Figure 6:
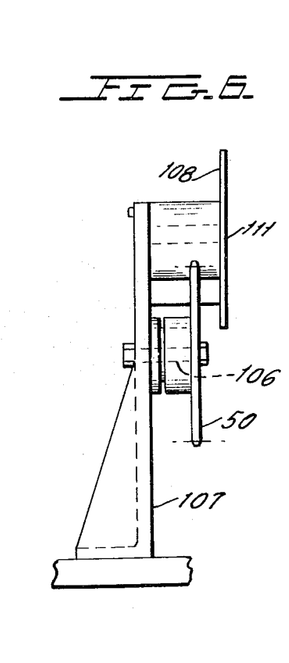
FIG. 6 is a fragmentary end view at the input end of the unloader looking in the direction of arrows 6—6 of FIG. 3.
Figure 7:
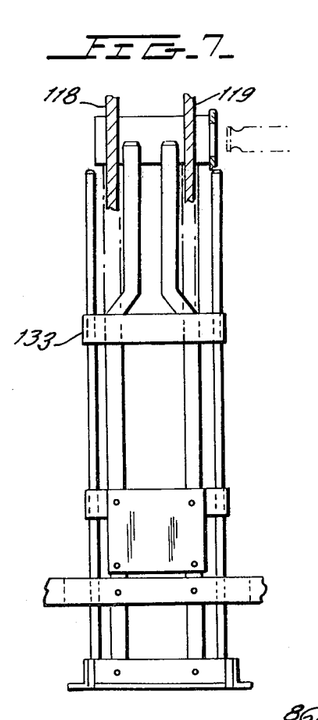
FIG. 7 is an end view of the output conveyor chute looking in the direction of arrows 7—7 of FIG. 3.
Figure 8:
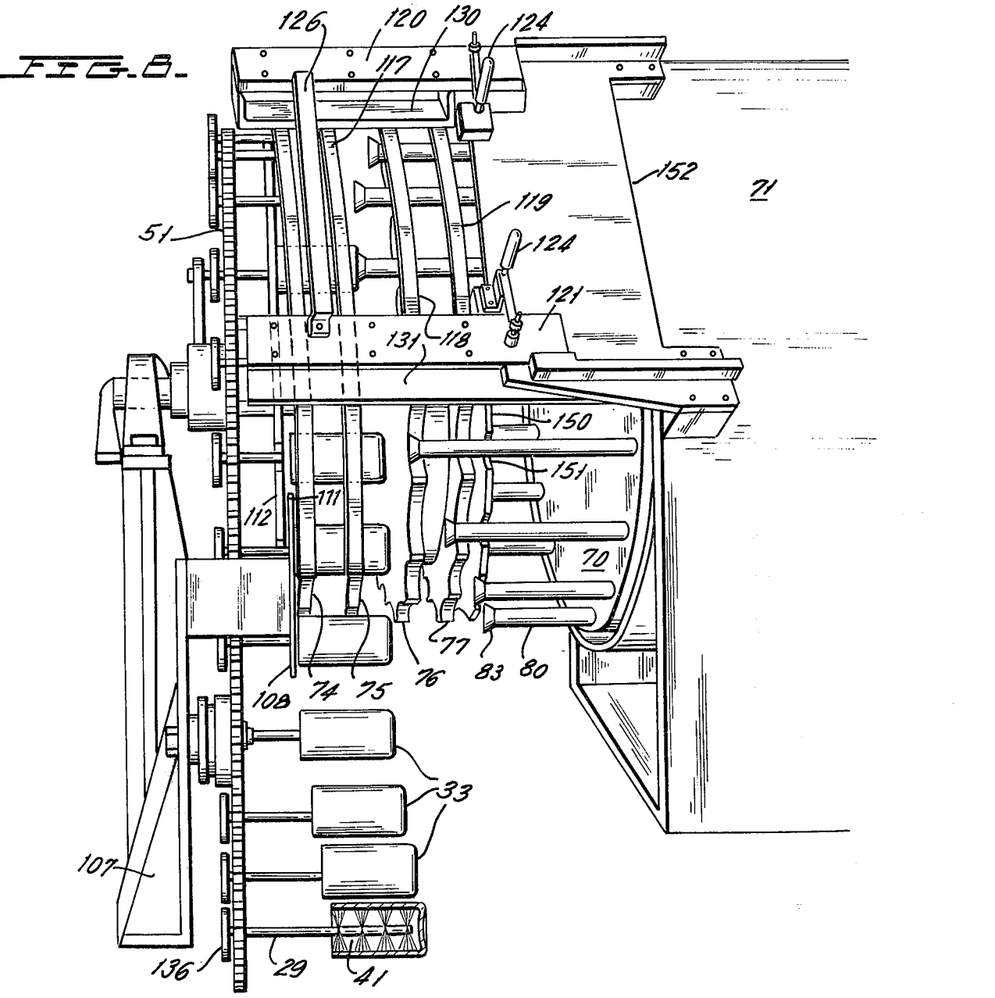
FIG. 8 is a perspective looking at the in-feed end of the unloader, generally at the angle indicated by arrow 8 in FIG. 1.
Figures 9, 10:
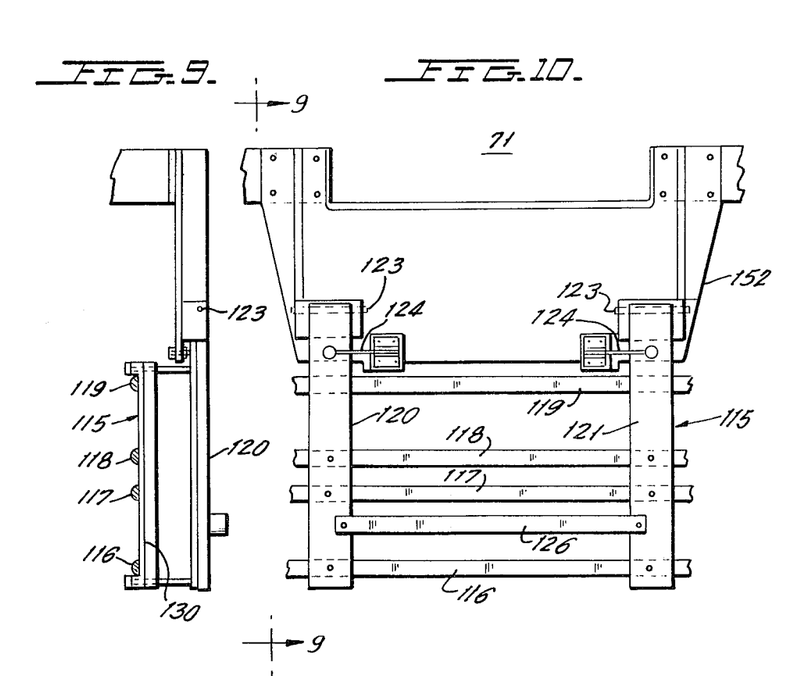
FIG. 9 is a plan view of one of the top guides, looking in the direction of arrows 9—9 of FIG. 3.
FIG. 10 is an end view of the top guide of FIG. 9 looking in the direction of arrows 10—10.

As seen best in FIG. 5, retriever rod 80 is hollow and is constructed of axially aligned separable front and rear sections 87, 88. Disposed within rear section 88 and extending along the axis thereof is valve member 90 that is biased forwardly, or to the left with respect to FIG. 5, by coiled compression spring 89. Movement of member 90 to the left with respect to suction cup 83 is limited by engagement of member 90 with the right end of rod section 87. Member 90 is provided with axial passage 91 that extends from the right end thereof and terminates to the rear of exterior conical seat 92 at the forward end of member 90. Transverse vacuum ports 93 of member 90 communicate with passage 91 as do transverse exhaust ports 94.

With valve member 90 in the position shown in FIG. 5, there is a continuous vacuum passage from the interior of hollow vacuum feed tube 79 to the interior of suction cup 83. This passage extends through the axial passage of rod element 87, vacuum ports 93, axial passage 91 of valve member 90, the axial passage of rod section 88 and passage 95, to the interior of suction cup 83. Valve member 90 is in the position of FIG. 5 when rod 80 is extended rearward as when suction cup 83 is engaged with the closed forward end of can 33.

As retriever rod 80 moves near its most forward position, conical seat 92 of valve member 90 engages internal conical seat 96 at the rear end of vacuum feed tube 79. Continued forward movement of rod 80 forces member 90 rearward toward suction cup 83 until a point is reached where exhaust ports 94 of member 90 are aligned with exhaust ports 97 in rod member 88. At this time valve member 90 seals off the interior of vacuum feed tube 79 so that vacuum is no longer being applied to the interior of retriever rod 80, and at this time the alignment of exhaust ports 94 and 97 permits venting of the interior of suction cup 83 through passage 95, the axial passage through rod member 88, the axial passage of valve member 90, and exhaust ports 94, 97.

Sprocket 50 for conveyor chain 30 is rotatably mounted on horizontal shaft 106 extending rearward from post 107. Also mounted to post 107 is split positioning plate 108 that is disposed above shaft 106 and slightly forward of sprocket 50. Plate 108 is provided with guide slot 109 having tapered mouth 110 at its lower end. Plate 108 is at a slight angle with respect to the vertical so that forward surface 111 thereof acts as a camming device. That is, as chain 30 leaves sprocket 50 and moves toward sprocket 51, carrier pin 29 moves through guide slot 109. During this movement of pin 29, the open end of can 33 rides along surface 111 which moves the can slightly forward to a position such that the open end of can 33 is slightly forward of stop ring 112 mounted to the forward side of sprocket 51.

Thus, as cans 33 move above split plate 108 and are captured in the rotating pockets 78 of rear star-wheel 73, these cans are forward of stop ring 112. The latter is provided to limit rearward movement of cans 33 as they are engaged by retriever rod 80 during full rearward extension thereof. The engagement of cans 33 with stop ring 112 assures that there will be firm engagement between suction cups 83 and the closed ends of cans 33.

Disposed above plate 108 in confronting relationship with the upper peripheral portions of star-wheels 69, 73 are a pair of cover-guides 114, 115, seen best in FIGS. 3 and 8 through 10. Cover-guide 115 includes four parallel plastic-coated arcuate guide strips 116–119 that are secured near opposite ends thereof to supports 130, 131 that depend from the respective transverse arms 120, 121. The forward ends of these arms are pivotally mounted to housing 71 on aligned pins 123, 123 in formations of support plate 152 secured to the top of housing 71 and extending to the rear thereof. Quick-release locking devices 124, 124 engageable with arms 120, 121 maintain cover-guide 115 locked in its closed or operating position with guide rails 116–119 positioned outboard of star-wheels 69, 73, so as to be very close to the cylindrical surfaces of can 33 to assure that the latter will remain in guide pockets 78 even at extremely high rotational speeds for star-wheels 69, 73. When locking devices 123, 124 are open, the rear ends of arms 120, 121 may be lifted upward by utilizing handle 126, secured to arms 120, 121 near the rear thereof. Lifting of arms 120, 121 opens cover-guide 115 and thereby permits access to the interior of the apparatus for the clearing of jams and the performance of maintenance on star-wheels 69, 73 and retriever rods 80. The construction of cover-guide 114 is essentially the same as the construction of cover-guide 115 so that a description of the former will not be given herein.

Rear guide rails 116, 117 of cover-guide 114 extend below arm 121 in the region where cans 33 are brought into engagement with rear star-wheel 73. Similarly, forward guide rails 118, 119 of cover-guide 115 extend below arm 120 to guide cans 33 into the upper end of vertically extending conveyor chute 133 at the outfeed side of front star-wheel 69.

In operation, cans 33 in passing through ovens 60–63 are rotated by virtue of the fact that each pin 29 is keyed to an individual friction wheel 136 disposed to the rear of chain 30, with wheel 136 rolling across appropriate stationary surfaces (not shown) disposed within ovens 60–63.

Now considering an individual can as it leaves the uppermost oven 63 and moves past sprocket 50. Conveyor pin 29 moves through guide slots 110 and the open end of can 33 slides across camming surface 111, causing can 33 to move slightly forward on carrier 29, 41. This can 33 then enters aligned pockets 78 in the periphery of rear star-wheel portions 74, 75. At this transfer location the motions of chain 30 and star-wheels 69, 73 are blended so can 33 is moving together with rear star-wheel 73. With the position of can 33 stabilized on star-wheel 73, suction cup 83 engages the closed end of can 33 by virtue of the fact that cam follower 84 is riding at an appropriate section of cam slot 85 so that retriever rod 80 is being extended by being driven rearward. Vacuum is now present within cup 83 to produce a firm grip between cup 83 and can 33.

Then cam slot 85 acts to retract rod 80, thereby moving can 33 forward into aligned pockets 78 in portion 76, 77 of front star-wheel 69. Now can 33 is completely clear of carrier 41. Retriever rod 80 continues to move rearward, with the application of vacuum to cup 83 being discontinued at this time by the engagement of valve seats 92, 96. Shortly thereafter the interior of cup 83 is vented to the atmosphere because of alignment between exhaust ports 94, 97. Release of can 33 from cup 83 is assured, since forward movement of can 33 is arrested by engagement thereof with front stop ring 150 secured to front star-wheel 77 on the forward side thereof. Stop 150 is in the form of a ring having peripheral notches 151 which provide clearances for retriever rods 80.

The instant invention has been described in connection with utilization of suction as the holding force applied between the retrieving rods and containers, since suction will be effective on both ferrous and nonferrous materials; however, it should now be apparent to those skilled in the art that when handling containers constructed of ferrous material magnetic forces may be utilized for holding purposes, and either permanent magnets or controlled electromagnets may be utilized in place of suction cups.

Although in the foregoing preferred embodiments have been discussed, many variations and modifications will now become apparent to those skilled in the art, and it is therefore understood that this invention is not limited by the disclosure but only by the appending claims.

The embodiments of the invention in which an exclusive privilege or property is claimed are defined as follows:

1. Apparatus for unloading empty containers from an in-feed conveyor and delivering same to a takeoff conveyor, said apparatus including a continuously rotating assembly having in-feed and out-feed regions at opposite sides thereof, said assembly including a rear section having a first plurality of pockets along the periphery thereof and a front section having a second plurality of pockets along the periphery thereof with the pockets of the first and second pluralities of pockets being in front to rear alignment, an in-feed conveyor chain moving along a path including a portion where motion of said chain blends with motion of said assembly between said input and output regions, said first plurality of pockets being positioned to receive containers delivered by said chain, said assembly also including a plurality of rods aligned with said pockets and extending generally parallel to the rotational axis of said assembly, control means for axially moving said rods rearward to engage containers on said conveyor chain and then moving such containers forward from said pockets of the rear section to said pockets of the front section to strip these containers from said chain, takeoff conveyor means operatively positioned at said output region to receive containers from said front section, said chain mounting a plurality of pin carriers extending generally perpendicular to the general plane of movement for said chain, said carriers at their forward ends having holding means which extends into containers to frictionally engage their inner surfaces, cam means at said input region operatively constructed to engage containers and move them slightly forward on said holding means to a first axial position before engagement thereof with the rear section, said assembly including a rear stop to the rear of the rear section and slightly rearward of containers at said first axial position, said rear stop positioned to arrest rearward movement of containers as the rods move toward their most rearward positions.

2. Apparatus as set forth in claim 1 in which the assembly also includes a front stop forward of the front section, said front stop positioned to arrest forward movement of containers as the rods move toward their most forward positions.

3. Apparatus as set forth in claim 1 in which containers are moving upward as they are engaged by the rear section and are moving downward under the influence of gravity as they leave the front section and enter the takeoff conveyor.

4. Apparatus as set forth in claim 1 also including means for connecting a vacuum source to said rods, each of said rods having a suction cup at its rear end engageable with a container on said chain, and an axially movable valve member disposed within each of said rods to control application of vacuum to said suction cup in accordance with axial positions on said rod which are coordinated with radial positions thereof.

5. Apparatus as set forth in claim 1 also including individually openable cover-guide means for and disposed above the peripheries of the rear and front sections.

6. Apparatus as set forth in claim 5 in which each of the cover-guide means include a plurality of arcuate strips operatively positioned to retain containers in the pockets.

7. Apparatus as set forth in claim 6 also including individual hinge means about which each of said cover-guide means is operable from a closed operative position to an open position wherein access may be had to elements of the apparatus for clearing of jams, and individual quick-release clamp means for holding each of the cover-guide means in its operative position.

8. Apparatus as set forth in claim 2 in which containers are moving upward as they are engaged by the rear section and are moving downward under the influence of gravity as they leave the front section and enter the takeoff conveyor.

9. Apparatus for unloading empty containers from an in-feed conveyor and delivering same to a takeoff conveyor, said apparatus including a continuously rotating assembly having in-feed and out-feed regions at opposite sides thereof, said assembly including a rear section having a first plurality of pockets along the periphery thereof and a front section having a second plurality of pockets along the periphery thereof with the pockets of the first and second pluralities of pockets being in front to rear alignment, an in-feed conveyor chain moving along a path including a portion where motion of said chain blends with motion of said assembly between said input and output regions, said first plurality of pockets being positioned to receive containers delivered by said chain, said assembly also including a plurality of rods aligned with said pockets and extending generally parallel to the rotational axis of said assembly, control means for axially moving said rods rearward to engage containers on said conveyor chain and then moving such containers forward from said pockets of the rear section to said pockets of the front section to strip these containers from said chain, takeoff conveyor means operatively positioned at said output region to receive containers from said front section means for connecting a vacuum source to said rods, each of said rods having a suction cup at its rear end engageable with a container on said chain, and an axially movable valve member disposed within each of said rods to control application of vacuum to said suction cup in accordance with axial positions on said rod which are coordinated with radial positions thereof, said valve member being biased forward and having its forward end adapted to engage a relatively stationary valve seat as the rod approaches its most forward position to isolate the suction cup from its vacuum source.

10. Apparatus as set forth in claim 9 in which both the rod and valve member include exhaust ports that are aligned for venting the interior of said suction cup to atmosphere when the rod is in its most forward position.

* * * * *